United States Patent [19]
Frenkel et al.

[11] Patent Number: 6,001,767
[45] Date of Patent: Dec. 14, 1999

[54] HETEROPOLY ACID PEROXIDE PROMOTER

[75] Inventors: Peter Frenkel; Ted M. Pettijohn, both of Longview, Tex.

[73] Assignee: Witco Corporation, Greenwich, Conn.

[21] Appl. No.: 08/905,593

[22] Filed: Aug. 4, 1997

[51] Int. Cl.⁶ .............................. B01D 31/00; C08L 33/06; C08F 4/28
[52] U.S. Cl. ........................ 502/160; 526/227; 525/340; 525/342
[58] Field of Search ............................ 502/160; 526/227; 525/340, 342

[56] References Cited

U.S. PATENT DOCUMENTS

| | | |
|---|---|---|
| 2,982,799 | 5/1961 | Klinkenberg . |
| 4,568,775 | 2/1986 | Aoshima et al. . |
| 4,666,993 | 5/1987 | Urano et al. ............................ 525/452 |
| 4,898,987 | 2/1990 | Knifton . |
| 5,030,767 | 7/1991 | Yorozu et al. . |
| 5,068,455 | 11/1991 | Yorozu et al. . |
| 5,320,821 | 6/1994 | Nagashima et al. . |
| 5,436,313 | 7/1995 | Klang et al. . |
| 5,488,178 | 1/1996 | Knifton et al. . |
| 5,510,516 | 4/1996 | Caubere et al. ......................... 560/220 |
| 5,525,704 | 6/1996 | Tamai et al. ............................ 528/423 |

FOREIGN PATENT DOCUMENTS

| | | |
|---|---|---|
| 2130030 | 2/1995 | Canada . |
| 0 325 032 | 7/1989 | European Pat. Off. . |
| 0 675 146 | 10/1995 | European Pat. Off. . |
| 95/04099 | 2/1995 | WIPO . |
| 98/16121 | 11/1998 | WIPO . |

OTHER PUBLICATIONS

Bednarek, et al. (1989) "Heteropolyacids—New Efficient Initiators of Cationic Polymerization", *Makromol. Chem.* 190: 929–938. No month available.

Pan, et al. (1995) "Study of Propene Oligomerization on Heteropolyacid Catalysts", *Chemical Reaction Engineering and Technology* 11 (1) :7–12. No month available.

Pope, et al. (1991) "Polyoxometalate Chemistry: An Old Field with New Dimensions in Several Disciplines", *Angew. Chem. Int. Ed. Engl.* 30:34–48. No month available.

Tianzi, et al. (Apr. 1986) "Selective Oligomerization of Isobutene in $C_4$ Mixture Using Heteropoly acids as Catalysts", *Petrochemical Technology* 15 (4) :211–213.

Vaughan, et al. (1994) "High–Pressure Oligomerization of Propene over Heteropoly Acids", *Journal of Catalysis* 147:441–454. No month available.

Wu, et al. (1994) "Catalytic Behaviour of Metal Ions Located at Different Sites of Heteropolycompounds", *Catalysis Letters* 23:195–205. No month available.

Abstract Accession No. 122:65498 CA (1994) to Qi, et al., *Gaodeng Xuexiao Huaxue Xuebao* 15 (9) :1357–1360. No month available.

Abstract Accession No. 125:97012 CA (1996) to Shan, et al., *Fenzi Cuihua* 10(2) :127–134. No month available.

Abstract Accession No. 125:124737 Ca (1996) to Shan, et al., *Gaodeng Xuexiao Huaxue Xuebao* 17 (4) :613–617. No month available.

*Primary Examiner*—Elizabeth D. Wood
*Attorney, Agent, or Firm*—Scully, Scott, Murphy & Presser

[57] ABSTRACT

The invention disclosed involves the use of heteropoly acids as promoters to decompose organic peroxides.

16 Claims, No Drawings

HETEROPOLY ACID PEROXIDE PROMOTER

BACKGROUND OF THE INVENTION

1. Field of the Invention

The instant invention concerns peroxides and the decomposition of same to facilitate initiation of certain chemical reactions. More specifically, the invention contemplates the use of select heteropoly acids, or HPAs, to obtain relatively controlled decomposition of organic peroxides, especially peroxyketals and dialkyl peroxides. Importantly, the practice of the present invention allows for less reactive peroxides—which are correspondingly safer to handle and store—to be effectively substituted for more reactive peroxides which are proportionately more hazardous and difficult to use.

2. Description of the Prior Art

Organic peroxides have multifarious commercial application, the more important of which predominate in the polymer industry. There, organic peroxides are used inter alia to initiate the polymerization and copolymerization of vinyl and diene monomers such as vinyl chloride, styrene, ethylene, acrylic acid and esters, methacrylic acid and esters, vinyl acetate, acrylonitrile and butadiene. Additionally, they are used to cure or cross-link various resins such as unsaturated polyesters, including e.g. unsaturated polyester-styrene blends; vinyl esters, including e.g. terpolymers of ethylene-vinyl acetate copolymer as well as other elastomers, including e.g. ethylene-propylene copolymers; thermoplastics, including e.g. polyethylene; and rubbers, including e.g. silicone rubber and styrene-butadiene rubber.

It is generally believed that organic peroxides owe their efficacy in this regard to their ability to generate free radicals on cleavage of the oxygen—oxygen bond which characterizes the peroxide functional group. In the ordinary industrial course, cleavage is obtained thermally; that is, the peroxide is heated to a point where it decomposes to form oxygen-centered free radicals. The corresponding rate of thermal decomposition is principally affected by the structure of the peroxide as well as the conditions under which heating occurs. Because the rate of decomposition is a critical process consideration in the polymer arts, certain conventions have evolved to express the differences in rate that inhere between various peroxides.

One of the more common of these is the measure of thermal activity of a peroxide in terms of its 10-hour half-life temperature, or 10-h HLT. This is the temperature required to attain 50% decomposition of a peroxide in a period of 10 hours. Generally, this temperature can range from well below 20° C. to well in excess of 200° C. For practical purposes, the measure is a comparative one: of any two peroxides, the one with the lower 10-h HLT is the one more easily decomposed on heating.

Other parameters useful for assessing the thermal lability of a particular peroxide include the onset temperature of decomposition and the self-accelerating decomposition temperature (SADT). Onset temperature is the point at which an uncontrolled thermal decomposition starts. Typically, it is measured by differential thermal analysis (DTA) using a small sample of peroxide in a sealed cell tested to determine the point at which the rate of temperature increase in same exceeds a pre-determined value. SADT, which can be directly correlated with onset temperature insofar as it increases linearly with onset temperature, represents the lowest temperature at which a given peroxide of a specific sample size undergoes self-accelerating decomposition within a set period of time, usually seven days. While these tests have especial utility in determining how a peroxide should be handled, stored and transported, they also give guidance in selecting a peroxide for a particular end use.

From a safety standpoint, it is desirable to use peroxides that are more thermally stable, e.g. those that have higher onset temperatures of decomposition, since these are less subject to unintended decompositions—which can be violently explosive—and require commensurately less precautions in handling, which can otherwise encumber processing. Paradoxically, it is this stability which makes these same peroxides less desirable as initiators or curing agents since higher temperatures have to be implemented to achieve the very reactivity for which they are being employed. The use of higher temperatures creates its own complications and hazards, and makes overall operations less economically efficient.

Various attempts have been made to reconcile these contradictory considerations thereby enabling the use of safer peroxides in a manner that mimics not only the reactivity of those that are more unstable, but does so under comparable conditions of temperature and cost. The most widely hailed in this regard involves the use of promoters, also known as activators, accelerators or destabilizers. These materials significantly decrease the amount of energy needed to break the oxygen—oxygen bond, thus lowering the onset temperature and accelerating the rate of peroxide decomposition. The enhanced decomposition that results usually occurs at temperatures well below that required under normal circumstances.

Promoters typically utilized in the polymer industry generally fall into two categories: those that contain transition metal salts, including metals such as cobalt, manganese, vanadium, copper, chromium, titanium, iron and the like; and those that contain tertiary amines. An example of the first are cobalt carboxylate promoters such as cobalt naphthenate which are commonly employed to destabilize ketone peroxides and cumene hydroperoxide which is often used to initiate the cure of unsaturated polyester and vinyl ester resins in the fiber reinforced polymer industry. Exemplifying the second are N,N-dimethylaniline, N,N-diethylaniline and N,N-dimethyl-p-toluidine—all widely used in the destabilization of benzoyl peroxide.

These known promoters do enhance peroxide reactivity, but with a cost: The transition metal-based materials tend to discolor the accelerated resins; thus cobalt-based promoters are known to tint cured polymers from pale to dark pink, and even to a blue green color. Amine accelerated systems are known to impart a disagreeable odor to the resultant polymer, which then also has a tendency to yellow with age. And both classes of promoters are known to cause significant and undesirable exotherms when applied in certain situations. Finally, not all classes of organic peroxides, such as perketals and peroxymonocarbonates, can be effectively promoted by conventional accelerators.

There is accordingly an ongoing need for a peroxide promoter that effectively and efficiently increases the reactivity of safer, high temperature organic peroxides so that they can be used in lieu of more reactive and hazardous peroxides, which promoter also does not evince the discoloration and malodorousness that attends the use of promoters known heretofore.

Heteropoly acids are thermally robust materials (up to 180°–300° C.) that are also stable against oxidation. These materials in the main are used in solid state catalysis, including catalytic oxidation. They are also known to be initiators of certain cationic polymerizations, including polymerizations of cyclic ethers and acetals. Other attempts to use these materials in the polymerization of olefins, and, separately, the oligomerization of unsaturated hydrocarbons have also been reported.

SUMMARY OF THE INVENTION

The present invention is directed to a method of promoting organic peroxides which meets the foregoing demands. The method comprises contacting an organic peroxide with a heteropoly acid in an amount effective to lower the onset temperature of decomposition of said peroxide. In another aspect, the invention relates to decomposing an organic peroxide using a heteropoly acid under conditions effective to cause initiation of certain chemical reactions, including (co)polymerization and curing or cross-linking. The invention also pertains to a composition of matter comprised of an organic peroxide component and a heteropoly acid component in an amount effective to lower the onset temperature of decomposition of said peroxide component.

Importantly, the practice of the invention provides a significant reduction in onset temperature of decomposition, thus permitting the use of safer, high temperature peroxides in substitution of more hazardous, low temperature peroxides—all without otherwise complicating processing or adversely affecting the resultant polymers.

DETAILED DESCRIPTION OF THE INVENTION

The method of the present invention comprises contacting at least one organic peroxide with at least one heteropoly acid in an amount effective to decompose said organic peroxide. Organic peroxides contemplated in this regard include, without limitation, those of the following classes: hydroperoxides; dialkyl peroxides; alpha-oxygen substituted alkyl hydroperoxides and dialkyl peroxides, including peroxyketals; ketone peroxides; primary and secondary ozonides; peroxyacids; diacyl peroxides (acyl and organosulfonyl peroxides); and alkyl peroxyesters (peroxycarbonates, peroxysulfonates, and peroxyphosphates).

In a preferred embodiment, the organic peroxide is a dialkyl peroxide or a peroxyketal.

Mixtures of organic peroxides may also be employed.

Heteropoly acids generally useful in the present invention are those that are soluble in both water and organic solvents. The solutions thus formed should be strong complex polybasic acids. By pKa values, they should be similar in strength to perchloric acid.

Of the heteropoly acids useful in the practice of the present invention, those having the formula:

$$H_x[X\ M_{12}O_{40}]$$

where X is phosphorous or silicon, M is molybdenum or tungsten and x is 3 to 4 are preferred. Examples of heteropoly acids in this regard include, without limitation: phosphotungstic acid ($H_3PW_{12}O_{40}$ or PTA); phosphomolybdic acid ($H_3PMo_{12}O_{40}$ or PMA); silicotungstic acid ($H_4SiW_{12}O_{40}$ or STA); and silicomolybdic acid ($H_4SiMo_{12}O_{40}$ or SMA).

The HPA's may be employed in anhydrous or in the more commonly-available hydrate form.

Mixtures of HPAs may also be used.

The present invention is undertaken with the proviso that when the heteropoly acid is phosphomolybdic acid the organic peroxide is not a peroxydicarbonate. Reference here is had to commonly owned U.S. Ser. No. 08/656,095 filed May 31, 1996, now U.S. Pat. No. 5,719,304 wherein the use of phosphomolybdic acid was found to have a stablilizing, not a destabilizing or decomposing effect on peroxydicarbonate.

While not intending to be bound to any theory, it is postulated that in the present invention the acid proton and possibly the heteropolyanion of the HPA form an active species which causes the decomposition of the organic peroxide to occur.

For purposes of the invention, the HPA and peroxide may be contacted by techniques conventional to the art, included among which are direct contact between pure HPA and pure peroxide, and contact where either one or both the HPA and organic peroxide is present in another medium. In one practice of the invention, it is preferred if the HPA is in solution. Solvents in this regard include water and organic solvents including without limitation: ethers, alcohols, ketones and esters.

The effective amount of HPA required to lower the onset temperature of decomposition for any given organic peroxide in the manner contemplated by the invention will depend upon the particular HPA, organic peroxide and rate of decomposition desired. Generally, amounts effective for purposes of the invention are up to about 10 weight percent HPA based on the weight of organic peroxide. Preferably, about 0.05 to about 3.5 weight percent, and more preferably about 0.1 to about 3.0 weight percent HPA is contacted with organic peroxide.

As before stated, in an embodiment of the present invention, HPA can be in solution. Although the concentration of HPA that can be present in solution can vary subject to the amounts of HPA delineated above, it is preferred if the solution contains up to about 70 weight percent HPA based on Etotal weight percent of solution. Preferably, the solution contains about 10 to 60 weight percent HPA based on total weight of solution, more preferably about 30 to about 50 weight percent.

In another aspect of the instant invention, decomposition of the organic peroxide takes place in the presence of various monomers under conditions effective to polymerize or copolymerize same. Preferred monomers in this regard are ethylenic and like monomers, including without limitation, vinyl and diene monomers such as vinyl chloride, styrene, ethylene acrylic acid and esters thereof, methacrylic acid and esters thereof, vinyl acetate, acrylonitrile, and butadiene.

In yet another aspect of the invention, decomposition of the organic peroxide takes place in the presence of various resins under conditions effective to cure or cross link same. Preferred curable or cross-linkable resins in this regard are unsaturated polyesters including without limitation unsaturated polyester-styrene blends; vinyl esters such as terpolymers of ethylene-vinyl acetate copolymer and other elastomers such as ethylene-propylene copolymers; thermoplastics such as polyethylene; and rubbers such as silicone rubber and styrene-butadiene rubber.

The following examples are intended to illustrate the present invention and in no way should be construed as limiting or otherwise circumscribing the same. Numerous additional embodiments within the spirit of the invention will become apparent to those skilled in the art.

EXAMPLES

Hydrates of the following HPA's were used in the Examples:

$H_3PW_{12}O_{40}$—phosphotungstic acid (PTA) (from Aldrich)
$H_3PMo_{12}O_{40}$—phosphomolybdic acid (PMA) (from Aldrich)

$H_4SiW_{12}O_{40}$—silicotungstic acid (STA) (from Aldrich)
$H_4SiMo_{12}O_{40}$—silicomolybdic acid (SMA) (from Strem)

The hydrates of these HPA's were separately dissolved in ethanol or other solvents as indicated in the following Examples, and then added to the peroxides and in the amounts indicated below. The resulting peroxide-HPA mixtures were then analyzed by Differential Thermal Analyzer (Radex Solo, marketed by Astra Scientific International, Pasadena, Calif.) to determine the onset temperature as follows: using an isothermal hold temperature of 30° C. for 15 minutes and then a temperature increase of 1° C./minute to 130° C., the onset temperature was measured for a one gram sample of the respective peroxide-HPA mixtures in a sealed cell. The onset temperature was measured both by noting the point whereat the rate of increase ($\Delta T$) of the sample temperature reached 0.2° C./minute and also the point where the rate of increase in pressure ($\Delta P$) of the closed sample cell reached 1.0 psi/minute. $\Delta T$ is the difference between the oven temperature and the sample temperature. $\Delta P$ is the difference between a reference pre-calibrated pressure and the pressure developed in the sealed sample cell.

Hot Block Gel Testing, as employed to evaluate resin cure characteristics in various of the Examples, was conducted as follows: A 50.0±0.log sample of resin was measured into a 5 oz. paper cup. Promoter (HPA as per the present invention or metal salts as conventionally used, e.g. cobalt naphthenate solution), when used, was added to the resin at ±0.01 g and blended into the resin using a spatula. Peroxide was then weighed into a cup at ±0.01 g followed by blending with a spatula. All resin samples were made consecutively to reduce bias errors. The resulting mixture was covered and equilibrated at room temperature for 15 to 30 minutes. A 5 mL aliquot of the catalyzed resin mix was delivered to the cavity of a pre-heated hot block tester. The cavity was lubricated with silicone grease as a release agent. The temperature of the resin during cure was recorded via a thermocouple and chart recorder. Each experiment was terminated after the peak exotherm was observed.

Gel time was taken at 10° C. above the block temperature. Peak exotherm is the maximum temperature achieved during the cure process. Exotherm time (exo time) is the time at which peak exotherm is reached.

In all experiments related to Hot Block Gel Testing, Aropol 2036 unsaturated polyester resin (Ashland Chemical) was used. The Hot Block temperature was 250° F. Cobalt naphthenate was obtained from OMG as a 6% Co solution in mineral spirits.

EXAMPLE 1

Destabilization of Organic Peroxides with Heteropoly Acids

The effectiveness of using various HPA's as destabilizers to lower the onset temperature of decomposition for peroxides in accordance with the present invention was evaluated using t-butyl peroxyneodecanoate and its 75% solution in odorless mineral spirits (OMS), commercially supplied by Witco under the tradenames Esperox 33 and Esperox 33M. Onset temperature, measured by DTA using $\Delta T$ and $\Delta P$ as described above, was determined for various solutions containing PTA, PMA, STA and SMA. The results are shown in Table 1 below:

TABLE 1

Evaluation of HPA Effectiveness for t-butyl Peroxyneodecanoate

| Additive | Wt. % of Additive Solution | Wt. % of Pure Additive | Onset Temperature ° C. by $\Delta T$ | by $\Delta P$ |
|---|---|---|---|---|
| Interaction with Esperox 33M | | | | |
| None | — | — | 61.5 | 61.5 |
| PTA-50* | 0.5 | 0.25 | 56.2 | 56.7 |
| PTA-50 | 3.0 | 1.5 | 52.4 | 53.5 |
| PTA-50 | 5.0 | 2.5 | 50.0 | 51.7 |
| PTA-50 | 6.0 | 3.0 | 49.9 | 51.3 |
| PTA-70 | 5.0 | 3.5 | 50.1 | 51.8 |
| PMA-20 | 0.5 | 0.1 | 56.3 | 56.5 |
| PMA-20 | 2.0 | 0.4 | 57.3 | 57.6 |
| PMA-50 | 5.0 | 2.5 | 56.3 | 56.7 |
| STA-50 | 5.0 | 2.5 | 55.8 | 56.8 |
| STA-70 | 0.5 | 0.35 | 56.2 | 56.7 |
| SMA-50 | 5.0 | 2.5 | 52.9 | 53.7 |
| Interaction with Esperox 33 | | | | |
| None | — | — | 58.3 | 58.3 |
| PTA-50 | 5.0 | 2.5 | 49.3 | 50.4 |
| SMA-50 | 5.0 | 2.5 | 52.9 | 53.7 |

*The suffix "-50" refers to the weight percent of HPA that is in solution with ethanol solvent. Thus, PTA-50 means 50 weight percent solution of phosphotungstic acid in ethanol, PTA-70 means 70 weight percent solution of phosphotungstic acid in ethanol, etc..

As seen from Table 1, the use of HPA's as per the invention decreased the onset temperature from that evinced by the peroxide without HPA. Indeed, the data of Table 1 shows that the practice of the present invention can result in a dramatic drop in onset temperature. For example, addition of a 50 weight percent PTA in ethanol solution to Esperox 33M at a level of just 5% dropped the onset temperature (by $\Delta T$) by almost 20%: from 61.5° C. to 50.0° C.

As suggested by Table 1, the amount of solvent (ethanol) added along with the HPA can affect the ability of HPA to accelerate peroxide decomposition. This behavior is believed to manifest at times because the activity or active concentrations of the acid decrease with increasing concentration. Under these circumstances, moderate concentrations of HPA, e.g. about 20 to about 50 weight percent, are preferably employed.

The reactivity of various classes of organic peroxides with HPA as practiced by the invention was screened using PTA (5 weight percent loading of a 50 weight percent solution in ethanol) as a representative HPA. PTA was added to samples of divers organic peroxides in the manner set forth above and onset temperature, by both $\Delta T$ and $\Delta P$, was measured using DTA. The results are shown in Table 2 below:

TABLE 2

Destabilization of Organic Peroxides with Phosphotungstic Acid Solution

| Organic Peroxide | Wt. % of Pure Additive | Onset Temperature ° C. by $\Delta T$ | by $\Delta P$ |
|---|---|---|---|
| I. Peresters | | | |
| Esperox 10 | None | 97.6 | 103.7 |
| Esperox 10 | 2.5 | 83.5 | 85.1 |
| Esperox 12MD | None | 115.2 | 108.4 |

TABLE 2-continued

Destabilization of Organic
Peroxides with Phosphotungstic Acid Solution

| Organic Peroxide | Wt. % of Pure Additive | Onset Temperature ° C. by ΔT | Onset Temperature ° C. by ΔP |
|---|---|---|---|
| Esperox 12MD** | 2.5 | 67.5 | 69.0 |
| Esperox 28 | None | 78.9 | 78.9 |
| Esperox 28 | 2.5 | 78.0 | 77.1 |
| Esperox 31M | None | 69.1 | 65.7 |
| Esperox 31M | 2.5 | 58.7 | 57.9 |
| Esperox 33M | None | 61.5 | 61.5 |
| Esperox 33M | 2.5 | 50.0 | 51.7 |
| Esperox 33 | None | 58.3 | 58.3 |
| Esperox 33 | 2.5 | 49.3 | 50.4 |
| Esperox 52M-60 | None | 109.3 | 103.9 |
| Esperox 52M-60** | 2.5 | 64.6 | 69.0 |
| Esperox 401 | None | 95.3 | 93.6 |
| Esperox 401 | 2.5 | 82.7 | 85.3 |
| Esperox 497 | None | 105.0 | 104.0 |
| Esperox 497 | 2.5 | 87.6 | 88.8 |
| Esperox 545M | None | 60.7 | 57.9 |
| Esperox 545M | 2.5 | 55.1 | 54.1 |
| Esperox 551M | None | 64.6 | 63.3 |
| Esperox 551M | 2.5 | 60.8 | 59.2 |
| Esperox 570 | None | 80.2 | 78.9 |
| Esperox 570 | 2.5 | 72.1 | 72.6 |
| Esperox 750M | None | 62.6 | 62.2 |
| Esperox 750M | 2.5 | 50.6 | 51.8 |
| II. Peroxymonocarbonate | | | |
| Esperox C-496 | None | 94.4 | 110.8 |
| Esperox C-496 | 2.5 | 81.7 | 90.5 |
| III. Peroxyketal | | | |
| USP-400P | None | 92.0 | 109.0 |
| USP-400P** | 2.5 | 39.9 | 49.7 |
| IV. Ketone Peroxides | | | |
| Hi-Point 90 | None | 108.8 | 110.1 |
| Hi-Point 90 | 2.5 | 67.3 | 70.3 |
| USP-240 | None | 101.3 | 102.9 |
| USP-240 | None | 89.3 | 89.6 |

Esperox 10 = tertiary-Butyl peroxybenzoate, technically pure
Esperox 12MD = tertiary-Butyl peroxyacetate, 60% solution in odorless mineral spirits (OMS)
Esperox 28 = tertiary-Butyl peroxy-2-ethyl-hexanoate, technically pure
Esperox 31M = tertiary-Butyl peroxypivalate, 75% solution in OMS
Esperox 33 = tertiary-Butyl peroxyneodecanoate, technically pure
Esperox 33M = tertiary-Butyl peroxyneodeanoate, 75% solution in OMS
Esperox 52M-60 = tertiary-Amyl peroxyacetate, 60% solution in OMS
Esperox C-59 = tertiary-Amyl peroxy 2-ethylhexyl carbonate, technically pure
Esperox 401 = tertiary-Butyl peroxyisononanoate, technically pure
Esperox 497 = tertiary-Butyl peroxy-2-methyl-benzoate, technically pure
Esperox 545M = tertiary-Amyl peroxyneodecanoate, 75% solution in OMS
Esperox 551M = tertiary-Amyl peroxypivalate, 75% solution in OMS
Esperox 570 = tertiary-Amyl peroxy 2-ethyl-hexanoate, technically pure
Esperox 750M = tertiary-Butyl peroxyneo-heptanoate, 75% solution in OMS
Esperox C-496 = tertiary-Butyl peroxy 2-ethylhexyl carbonate, technically pure
Esperox 939M = Cumyl peroxyneodecanoate, 75% solution in OMS
Esperox 5100 = tertiary-Amyl peroxybenzoate, technically pure
USP-400P = 1,1-Bis(tertiary Butyl peroxy) cyclohexane, 80% solution in butyl benzyl phthalate
Hi-Point 90 = Methyl ethyl ketone peroxide, solution in dimethyl phthalate, active oxygen 9.0%
USP-240 = 2,4-Pentanedione peroxide, solution, active oxygen 4.0%
Espercarb 840M = Di-(2-ethylhexyl)peroxydicarbonate, 75% solution in OMS
CHP-158 = Cumene hydroperoxide
DTAP = Di-tertiary-amyl peroxide
*PTA was added as 50 weight percent solution in ethanol.
**A partial phase separation was observed.

As evident from the data of Table 2, the practice of the invention as represented by PTA effectively promoted all tested organic peroxides, including the relatively stable peroxymonopercarbonate Esperox C-496 and the perketal USP-400P.

EXAMPLE 2

Heteropoly Acids as Promoters for Resin Cure

This example demonstrates the effectiveness of using HPA's in accord with the practice of the present invention to drive resin cure at decreased temperatures. PTA was employed as representative of the HPA's contemplated by the invention; cobalt naphthenate was used as representative of conventional promoters. Specifically, a screening experiment was conducted to determine the ability of PTA to promote the cure of an unsaturated polyester resin by several classes of organic peroxides and to compare same against the use of cobalt naphthenate and unpromoted peroxide. The evaluation was conducted using elevated temperature cure in a Hot Block Tester as hereinbefore described. The results are shown in Table 3 below:

TABLE 3

Hot Block Screening Experiments with Promoted Systems

| Organic Peroxide | Promoter | Weight of Promoter, phr | Gel Time, min. | Exo Time, min. | Peak Exo, ° F. | Gel to Peak, min. | Effect of Promoter |
|---|---|---|---|---|---|---|---|
| I. Peresters | | | | | | | |
| Esperox 10 | None | 0.00 | 3.188 | 3.688 | 374 | 0.500 | — |
| Esperox 10 | PTA-30 | 0.25 | 1.219 | 1.625 | 319 | 0.406 | Acceleration |
| Esperox 10 | CoNap-6 | 0.25 | 0.875 | 1.313 | 339 | 0.436 | Acceleration |
| Esperox 33 | None | 0.00 | 0.688 | 1.188 | 324 | 0.500 | — |
| Esperox 33 | PTA-30 | 0.25 | 0.938 | 1.469 | 298 | 0.531 | Inhibition |
| Esperox 33 | CoNap-6 | 0.25 | 0.844 | 1.406 | 317 | 0.562 | Inhibition |
| Esperox 570 | None | 0.00 | 0.750 | 1.219 | 340 | 0.469 | — |
| Esperox 570 | PTA-30 | 0.25 | 0.875 | 1.313 | 312 | 0.438 | Inhibition |
| Esperox 570 | CoNap-6 | 0.25 | 0.625 | 1.156 | 326 | 0.531 | Acceleration |

TABLE 3-continued

Hot Block Screening Experiments with Promoted Systems

| Organic Peroxide | Promoter | Weight of Promoter, phr | Gel Time, min. | Exo Time, min. | Peak Exo, °F. | Gel to Peak, min. | Effect of Promoter |
|---|---|---|---|---|---|---|---|
| Esperox 939M | None | 0.00 | 0.656 | 1.156 | 323 | 0.500 | — |
| Esperox 939M | PTA-30 | 0.25 | 1.688 | 2.250 | 297 | 0.562 | Inhibition |
| Esperox 939M | CoNap-6 | 0.25 | 0.688 | 1.250 | 316 | 0.562 | No Effect |
| Esperox 5100 | None | 0.00 | 2.156 | 2.625 | 350 | 0.469 | — |
| Esperox 5100 | PTA-30 | 0.25 | 1.156 | 1.594 | 310 | 0.438 | Acceleration |
| Esperox 5100 | CoNap-6 | 0.25 | 0.719 | 1.188 | 328 | 0.469 | Acceleration |
| II. Peroxydicarbonate | | | | | | | |
| Espercarb 840M | None | 0.00 | 0.938 | 1.438 | 329 | 0.500 | — |
| Espercarb 840M | PTA-30 | 0.25 | 0.875 | 1.344 | 299 | 0.469 | Acceleration |
| Espercarb 840M | CoNap-6 | 0.25 | 0.938 | 1.469 | 325 | 0.531 | No Effect |
| III. Peroxymonocarbonates | | | | | | | |
| Esperox C-59 | None | 0.00 | 0.969 | 1.500 | 356 | 0.531 | — |
| Esperox C-59 | PTA-30 | 0.25 | 1.188 | 1.656 | 307 | 0.468 | Inhibition |
| Esperox C-59 | CoNap-6 | 0.25 | 1.156 | 1.656 | 346 | 0.500 | Inhibition |
| Esperox C-496 | None | 0.00 | 2.406 | 2.969 | 354 | 0.563 | — |
| Esperox C-496 | PTA-30 | 0.25 | 1.156 | 1.625 | 312 | 0.469 | Acceleration |
| Esperox C-496 | CoNap-6 | 0.25 | 1.625 | 2.094 | 340 | 0.469 | Acceleration |
| IV. Peroxyketal | | | | | | | |
| USP-400P | None | 0.00 | 1.563 | 2.000 | 346 | 0.437 | — |
| USP-400P | PTA-30 | 0.25 | 1.063 | 1.531 | 318 | 0.469 | Acceleration |
| USP-400P | CoNap-6 | 0.25 | 1.813 | 2.250 | 352 | 0.437 | Inhibition |
| V. Ketone Peroxide | | | | | | | |
| Hi-Point 90 | None | 0.00 | 1.938 | 2.469 | 368 | 0.531 | — |
| Hi-Point 90 | PTA-30 | 0.25 | 0.938 | 1.375 | 313 | 0.437 | Acceleration |
| Hi-Point 90 | CoNap-6 | 0.25 | 1.094 | 1.563 | 342 | 0.469 | Acceleration |
| VI. Hydroperoxide | | | | | | | |
| CHP-158 | None | 0.00 | 2.875 | 3.625 | 377 | 0.750 | — |
| CHP-158 | PTA-30 | 0.25 | 1.813 | 2.375 | 304 | 0.562 | Acceleration |
| CHP-158 | CoNap-6 | 0.25 | 1.719 | 2.188 | 361 | 0.469 | Acceleration |
| VII. Dialkyl Peroxide | | | | | | | |
| DTAP | None | 0.00 | 3.844 | 4.375 | 372 | 0.531 | — |
| DTAP | PTA-30 | 0.25 | 1.688 | 2.219 | 308 | 0.531 | Acceleration |
| DTAP | CoNap-6 | 0.25 | 5.063 | 5.656 | 351 | 0.593 | Inhibition |

Hot block gel tester at 250° F.
Aropol 2036 resin
PTA-30 in TXIB
CoNap-6 (6% Co from OMG)
Active Peroxide level at 1.50 parts per hundred resin (phr)

As seen from Table 3, the practice of the present invention efficiently promoted resin cure for peroxyketals and dialkyl peroxides (DTAP) whereas cobalt naphthenate did not. Also as shown in Table 3, Peak Exotherms of PTA-promoted cures were lower than those for unpromoted cures, which circumstance is especially desirable in systems where a moderate exotherm is required. The systems that resulted from using PTA were also generally lower in color as compared to those prepared with the cobalt naphthenate.

What is claimed is:
1. A method for promoting an organic peroxide which comprises contacting an organic peroxide selected from the group consisting of dialkyl peroxides, organic hydroperoxides, alpha-oxygen substituted alkyl hydroperoxides and dialkyl peroxides, ketone peroxides, primary and secondary ozonides, diacyl peroxides and alkyl peroxyesters with a heteropoly acid in an amount effective to lower the onset temperature of decomposition of said organic peroxide with the proviso that if said heteropoly acid is phosphomolybdic acid said organic peroxide is not a peroxydicarbonate.

2. The method of claim 1 wherein said organic peroxide is a dialkyl peroxide, an alpha-oxygen substituted dialkyl peroxide or an alkyl peroxyester.

3. The method of claim 2 wherein said alpha-oxygen substituted dialkyl peroxide is a peroxyketal.

4. The method of claim 2 wherein said alkyl peroxyester is a peroxycarbonate.

5. The method of claim 1 wherein said heteropoly acid is selected from the group consisting of phosphotungstic acid, phosphomolybdic acid, silicotungstic acid and silicomolybdic acid.

6. The method of claim 5 wherein said amount of heteropoly acid is up to about 10% by weight of said organic peroxide.

7. The method of claim 6 wherein said amount of heteropoly acid is about 0.05 to about 3.5% by weight of said organic peroxide.

8. The method of claim 7 wherein said amount of heteropoly acid is about 0.1 to about 3.0% by weight of said organic peroxide.

9. A composition comprising:
(a) an organic peroxide component selected from the group consisting of dialkyl peroxides, organic hydroperoxides, alpha-oxygen substituted alkyl hydroperoxides and dialkyl peroxides, ketone peroxides, primary and secondary ozonides, diacyl peroxides and alkyl peroxyesters; and (b) a heteropoly acid in an amount effective to lower the onset temperature of decomposition of said organic peroxide component with the proviso that if said heteropoly acid is phosphomolybdic acid said organic peroxide is not a peroxydicarbonate.

10. The composition of claim 9 wherein said organic peroxide is a dialkyl peroxide, an alpha-oxygen substituted dialkyl peroxide or an alkyl peroxyester.

11. The composition of claim 10 wherein said alpha-oxygen substituted dialkyl peroxide is a peroxyketal.

12. The composition of claim 10 wherein said alkyl peroxyester is a peroxycarbonate.

13. The composition of claim 9 wherein said heteropoly acid is selected from the group consisting of phosphotungstic acid, phosphomolybdic acid, silicotungstic acid and silicomolybdic acid.

14. The composition of claim 13 wherein said amount of heteropoly acid is up to about 70% by weight of said organic peroxide.

15. A composition of claim 14 wherein said amount of heteropoly acid is about 10 to out 60% by weight of said organic peroxide.

16. A composition of claim 15 wherein said amount of heteropoly acid is about 30 to about 50% by weight of said organic peroxide.

* * * * *

UNITED STATES PATENT AND TRADEMARK OFFICE
CERTIFICATE OF CORRECTION

PATENT NO. : 6,001,767
DATED : December 14, 1999
INVENTOR(S) : P. Frenkel et al.

It is certified that error appears in the above-identified patent and that said Letters Patent is hereby corrected as shown below:

Column 3,
Line 54, "phosphorous" should read -- phosphorus --

Column 5,
Line 26, "50.0±0.log" should read -- 5.0±.010g --

Signed and Sealed this

Eighteenth Day of June, 2002

Attest:

Attesting Officer

JAMES E. ROGAN
Director of the United States Patent and Trademark Office